United States Patent [19]

De Filippo

[11] Patent Number: 5,713,636
[45] Date of Patent: Feb. 3, 1998

[54] HEADREST FOR MOTOR VEHICLE SEATS

[75] Inventor: Emilio De Filippo, Bruzolo, Italy

[73] Assignee: Gestind-M.B. Manifattura Di Bruzolo Spa, Turin, Italy

[21] Appl. No.: 766,175

[22] Filed: Dec. 12, 1996

[30] Foreign Application Priority Data

Jul. 16, 1996 [IT] Italy .................. TO96A0615

[51] Int. Cl.$^6$ .................. A47C 1/10
[52] U.S. Cl. .................. 297/410; 297/391
[58] Field of Search .................. 297/410, 391, 297/396, 404, 406, 408

[56] References Cited

U.S. PATENT DOCUMENTS 4,390,209  6/1983  Izuno et al. .................. 297/410
5,397,170  3/1995  Shrock .................. 297/391 X
5,590,929  1/1997  Hamelin .................. 297/410 X

FOREIGN PATENT DOCUMENTS 3106735  9/1982  Germany .................. 297/391
4313376  10/1994  Germany .................. 297/391

Primary Examiner—Laurie K. Cranmer
Attorney, Agent, or Firm—Sughrue, Mion, Zinn, Macpeak & Seas, PLLC

[57] ABSTRACT

A headrest for motor vehicle seats wherein the two support rods of the headrest resilient body are fitted through a pair of tubular guide elements adapted to be rigidly connected to the structure of a seat backrest. The two tubular elements are formed by molded plastic material bushes whose mutual positioning is fixedly pre-set upon molding thereof.

4 Claims, 3 Drawing Sheets

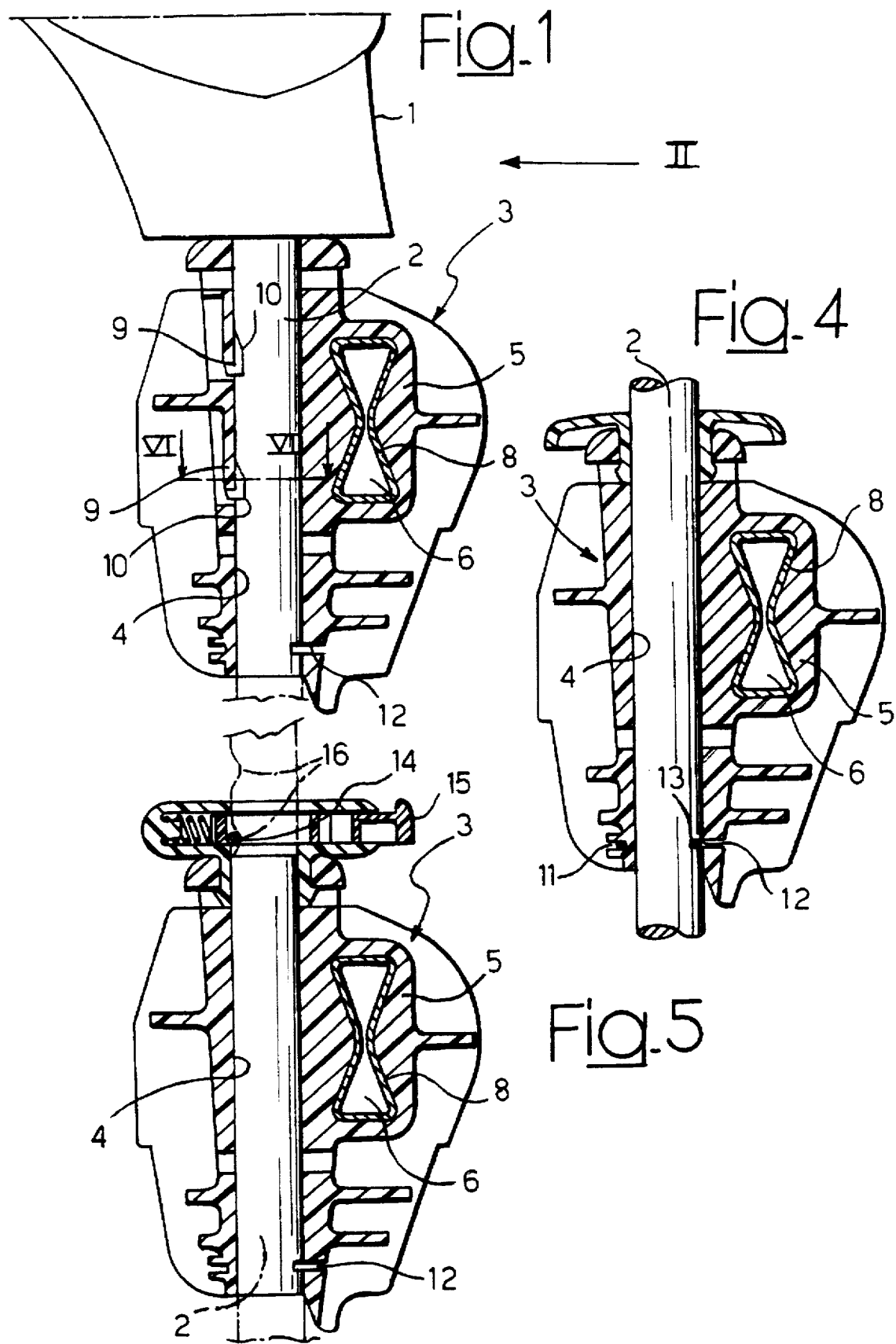

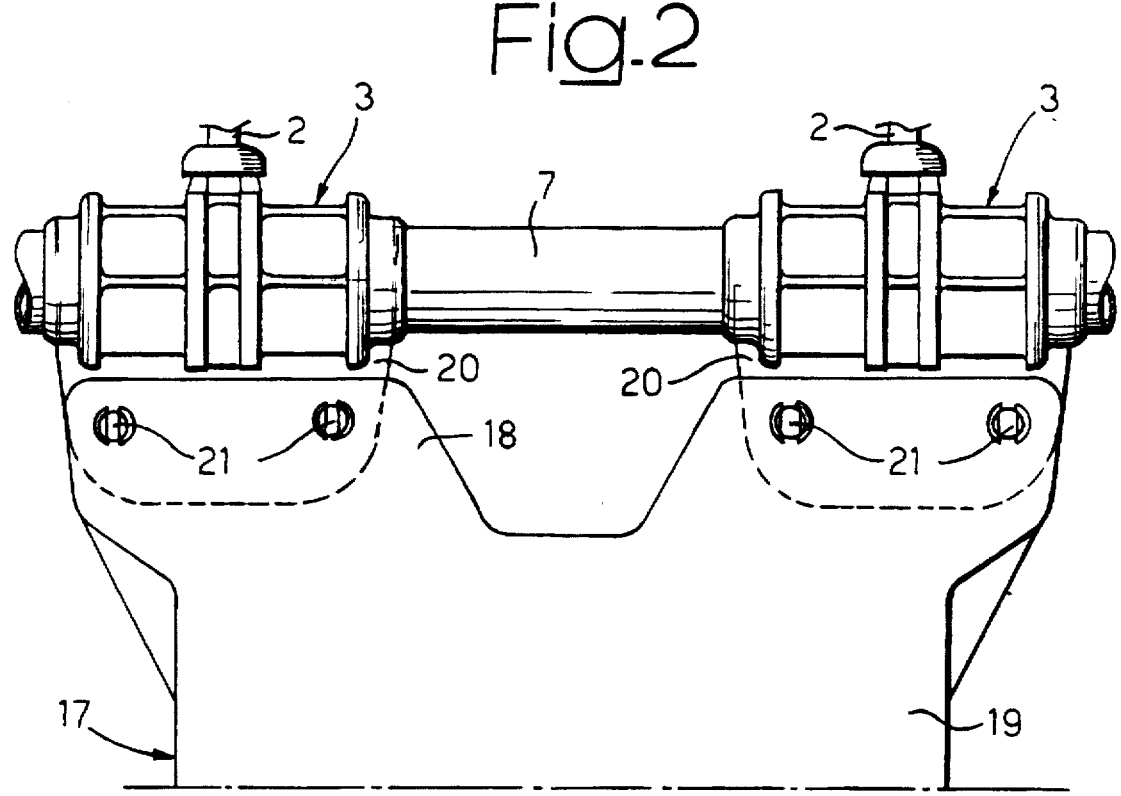
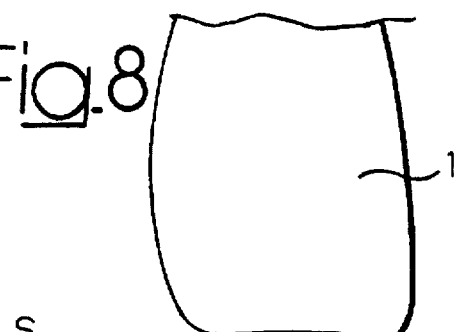
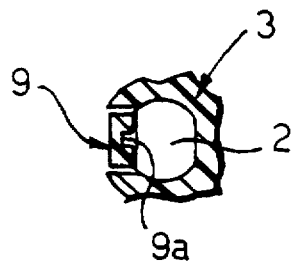
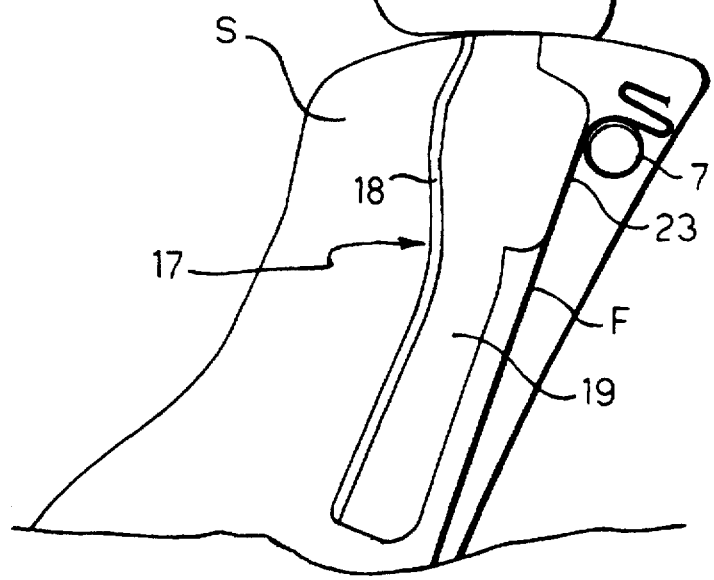

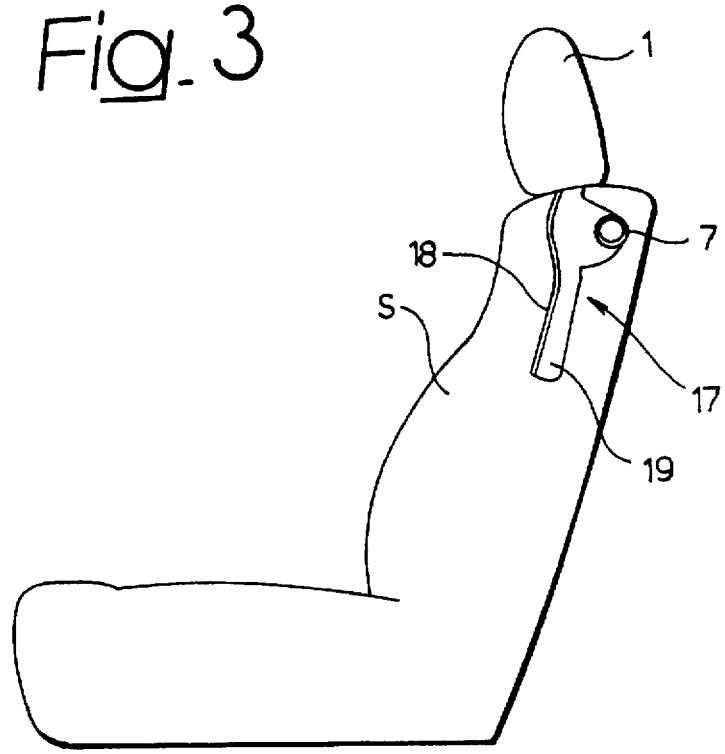
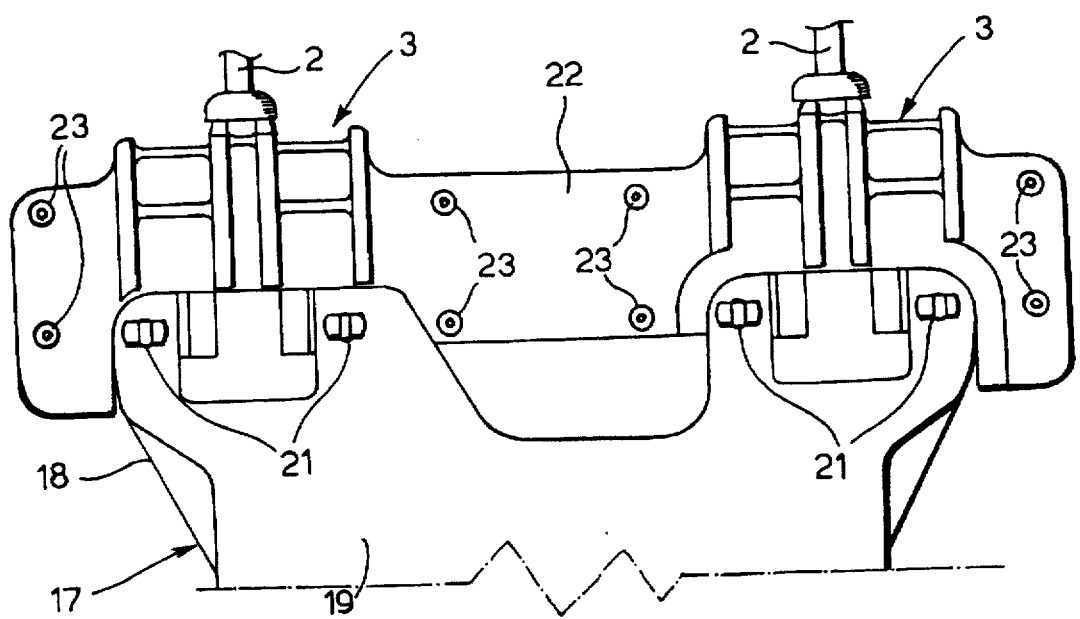

HEADREST FOR MOTOR VEHICLE SEATS

BACKGROUND OF THE INVENTION

The present invention relates to headrests for motor-vehicle seats, comprising a resilient body, a pair of parallel support rods projecting from the resilient body, and a pair of tubular guide elements adapted to be rigidly secured to the structure of a seat backrest so as to receive therethrough said support rods.

In the headrests of this type according to the prior art, such as disclosed and shown for instance in European patent EP-B-0582765 in the name of the same Applicant, the above tubular elements are generally constituted by metal tubes secured by welding to the upper transverse member of the seat backrest structure.

This arrangement involves relevant manufacturing problems, since it is necessary to ensure absolute positioning precision of the two metal tubes between each other and relative to the backrest structure in order to warrant perfect insertion of the support rods therethrough and, as far as headrests whose support rods are vertically movable for height adjustment thereof are concerned, proper axial sliding of these support rods along the metal tubes. If the above requirements are not fulfilled, severe difficulties may arise during assembling of the headrest on the seat backrest, and/or height adjustment as well as removal thereof in case of need may result practically impossible.

SUMMARY OF THE INVENTION

The object of the present invention is to overcome the above drawback, and more particularly to provide a headrest for motor-vehicle seats of the type set forth in the above, wherein mounting accuracy of the tubular guide elements of the support rods be warranted in an absolute way, with a simple and economical production method, so as to avoid any risks related to mounting or height adjustment difficulty of the headrest.

According to the invention this object is achieved essentially by virtue of the fact that said two tubular elements are formed by moulded plastic material bushes whose mutual positioning is rigidly pre-set upon moulding thereof.

Due to this idea of solution all inconveniences are overcome which may derive from the strict tolerances which are peculiar of metal structural works and welding thereof according to the prior art, thus ensuring through a simple and cheap manufacturing method both matching with the required tolerances for proper mounting and possible height adjustment of the headrest, and a higher sturdiness and thus safety in use of the headrest in connection with the operation loads even in case of crashes of the vehicle equipped therewith.

The invention contemplates, within the frame of this idea of solution, two alternative embodiments, normally directed the first to a front seat, and the second to a rear seat of a motor vehicle. In the first case the headrest comprises a mounting bar on which said two bushes are overmoulded, this bar being intended to constitute an upper transverse member of said backrest structure.

In the second case the headrest comprises a joining plate integrally formed by moulding with said two bushes, and rigid fixing means of said plate onto the backrest structure.

In both cases the two moulded plastic material bushes are selectively designed so as to house therethrough the headrest support rods in an axially restrained way, or in an axially slidable but unreleasable way, or in an axially slidable and releasable way.

BRIEF DESCRIPTION OF THE DRAWINGS

The invention will now be disclosed in detail with reference to the accompanying drawings, purely provided by way of non-limiting example, in which:

FIG. 1 is a diagrammatic and partially vertically sectioned view of a headrest for motorvehicle seats according to the invention, FIG. 2 is a rear elevational view according to arrow II of FIG. 1, FIG. 3 is a diagrammatic lateral elevational view in a reduced scale of the headrest according to the invention, FIGS. 4 and 5 show respective variants of FIG. 1, FIG. 6 is a horizontally sectioned and enlarged view along line VI—VI of FIG. 1, FIG. 7 shows a variant of FIG. 2, and FIG. 8 is a diagrammatic lateral elevational view in a reduced scale of the headrest according to the variant of FIG. 6.

DETAILED DESCRIPTION OF THE INVENTION

Referring initially to FIGS. 1 and 2, a headrest for motor-vehicle seats essentially comprises a resilient body or pillow 1, normally made of expanded plastic material and incorporating a supporting framework not shown in the drawings, since generally conventional, which in turn is rigidly or tiltably and/or slidably connected to a pair of parallel support rods 2 projecting from the base of the resilient body 1. As diagrammatically depicted in FIG. 3, in the mounted condition of the headrest the resilient body 1 is arranged in a fixed or in a height-adjustable way on top of the backrest S of a seat, normally a front seat, and the support rods 2 are fitted into the backrest S and are connected to the structure F thereof in the way which will be clarified here below.

In general terms, two tubular guide elements are provided for the mounting of the headrest support rods 2 relative to the seat backrest S. Unlike the prior art, in which these tubular guide elements are formed by metal tubes welded to the structure F of the backrest S, according to the present invention the two tubular elements are formed by moulded plastic material bushes, generally designated as 3, whose mutual positioning is rigidly pre-set upon moulding thereof. In the case of FIGS. 1 through 3, each bush 3 is formed by a one-piece body having an axial through cavity 4 along which the respective support rod 2 is passing through, and provided, rearwardly thereof, with an enlarged portion 5 having a through cavity 6 oriented at right angle relative to the cavity 4. This cavity 6 is passed through by a metal tubular mounting bar 7 normally having a circular cross-section. However, the areas of this mounting bar 7 fitted within the cavities 6 of the two bushes 3, indicated as 8, have a non-circular cross-section, for instance a "butterfly" section such as shown in the example, and the cavities 6 have a complementary cross-section. This is obtained by virtue of the fact that the two bushes 3 with the respective enlarged portions 5 are overmoulded, upon forming thereof, directly on the areas 8 of the mounting bar 7. This results into absolute warranty of the necessary accuracy in the relative positioning between the two bushes 3, and particularly of perfect parallelism thereof and precise spacing between the respective cavities 4 for insertion of the support rods 2.

The mounting bar 7, which in this embodiment is an integral part of the headrest according to the invention, is intended to form the upper transverse member of the structure F of the seat backrest S, and accordingly this bar 7 is then rigidly secured by welding or equivalent systems to the remaining portion of the structure F.

Each of the two moulded plastic material bushes 3 is integrally formed with outer stiffening ribs, such as depicted in the drawings, and the basic conformation thereof is such that each bush may be selectively designed so as to house the respective support rod 2 in an axially restrained way, or in an axially slidable but unreleasable way, or in an axially slidable and releasable way.

In the first case, shown in FIGS. 1 and 6, the wall of the bush 3 which is opposite to the enlarged portion 5 is integrally formed with resiliently yielding tooth elements 9 adapted to irreversibly snap-engage corresponding coupling notches 10 provided on the rod 2. Accordingly, following insertion of the rods 2 within the respective bushes 3, the headrest 1 is rigidly locked with respect to the mounting bar 7, and thus relative to the seat backrest S. The tooth elements 9 are however formed inferiorly with a recess 9a (FIG. 6) into which a suitable tool can be inserted so as to perform, in case of need, disengagement thereof from the notches 10 of the rods 2 and thus withdrawal of the headrest.

The same arrangement of the moulded plastic material bushes 3 shown in FIG. 1 is employed in case of an headrest whose resilient body 1, i.e. the supporting framework incorporated therein, is vertically slidable relative to the support rods 2, for the height adjustment of the headrest.

In the case of FIG. 4, related to an embodiment in which the support rods 2 are frictionally slidable along the bushes 3 for the height adjustment of the headrest, each of these bushes 3 is provided, in correspondence of a respective lower seat 11, with a wire spring 12, of a generally conventional type, adapted to engage a corresponding lower notch 13 of the respective support rod 2, so as to prevent withdrawal thereof from the related bush 3.

In the case of FIG. 5, which is directed to an embodiment according to which the support rods 2 are frictionally slidable along the respective bushes 3 and can also be withdrawn therefrom so as to remove the headrest, each bush 3 is provided at the respective top with a disengageable locking member 14 and associated spring push-button 15, adapted to co-operate in a known way with a number of notches 16 formed on the support rod 2. The disengageable locking member 14 will not be disclosed in detail, since substantially corresponding, for instance, to that disclosed and illustrated in already mentioned prior document EP-B-0582765.

As shown in FIGS. 2 and 3, the assembly formed by the two moulded plastic material bushes 3 and by the mounting bar 7, can be completed by a box-like body 17, formed by a front half-shell 18 and a rear half-shell 19 connected to each other and to lower plate-like appendages 20 of the two bushes 3, by means of snap-engaging coupling members 21.

The variant shown in FIGS. 7 and 8, which can be expressly referred to application of the headrest according to the invention to a rear seat of a motor-vehicle, differs from the solution previously disclosed in that the mutual positioning between the two moulded plastic material bushes 3, rigidly pre-set upon manufacturing thereof, is not performed by overmoulding them on the mounting bar 7, but rather is obtained by integrally moulding the two bushes 3 together with a one-piece joining plate 22, evidently also made of plastic material. According to this embodiment, in which parts which are identical or similar to those already previously disclosed are indicated by the same reference numerals, the joining plate 22 is provided with locking members 23 for rigid connection thereof to the structure F of the seat backrest S such as diagrammatically depicted in FIG. 8. In this embodiment the half-shells 18 and 19 of the box-like body 17 are secured, through the snap engagement members 21, to the joining plate 22.

Naturally, the details of construction and the embodiments may be widely varied with respect what has been disclosed and illustrate, without thereby departing from the scope of the present invention, such as defined in the appended claims. Thus, for instance, while in the shown examples the support rods 3 are rectilinear, they could also have an arcuate or curved design.

What is claimed is:

1. A headrest for a motor-vehicle seat having a backrest with a bearing structure, comprising a resilient body, a pair of parallel support rods projecting from the resilient body and a pair of tubular guide elements to be rigidly secured to said bearing structure of the seat backrest so as to receive therethrough said support rods, wherein said two tubular elements are formed by moulded plastic material bushes the mutual positioning of which is rigidly pre-set upon moulding thereof, wherein said two tubular elements are overmoulded on mounting bar adapted to be secured to said backrest bearing structure.

2. Headrest according to claim 1, wherein said mounting bar has, at least in correspondence of each of said moulded plastic material bushes, a non-circular cross-section portion, and each of said bushes has a hollow projection which is offset and perpendicular with respect to the corresponding support rod and formed around the respective non-circular cross-section portion of said mounting bar.

3. Headrest according to claim 1, further comprising a joining plate integrally formed by moulding with said two moulded plastic material bushes, and rigid fixing means of said joining plate to said backrest bearing structure.

4. Headrest according to claim 1, wherein said two moulded plastic material bushes are selectively designed so as to receive said support rods in an axially restrained way, in an axially slidable but unreleasable way, and in an axially slidable and releasable way, respectively.

* * * * *